United States Patent
Hutchins et al.

(10) Patent No.: US 9,790,419 B2
(45) Date of Patent: Oct. 17, 2017

(54) HIGH TEMPERATURE POLYMER GELS FOR WELL TREATMENTS AND THEIR USE

(75) Inventors: Richard D. Hutchins, Sugar Land, TX (US); Syed A. Ali, Sugar Land, TX (US); Maria Sarita Simon, Rosharon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1224 days.

(21) Appl. No.: 13/157,373

(22) Filed: Jun. 10, 2011

(65) Prior Publication Data
US 2011/0315382 A1    Dec. 29, 2011

Related U.S. Application Data

(60) Provisional application No. 61/357,773, filed on Jun. 23, 2010.

(51) Int. Cl.
   *E21B 43/16*    (2006.01)
   *C09K 8/512*    (2006.01)
   *C09K 8/508*    (2006.01)

(52) U.S. Cl.
   CPC ............ *C09K 8/512* (2013.01); *C09K 8/5083* (2013.01)

(58) Field of Classification Search
   CPC ....... C09K 8/512; C09K 8/5083; E21B 43/16; E21B 43/26; C04B 28/02
   USPC ..................................... 166/305.1, 300, 270
   See application file for complete search history.

(56) References Cited

U.S. PATENT DOCUMENTS

| | | | |
|---|---|---|---|
| 4,716,966 A | 1/1988 | Shu | |
| 4,744,418 A | 5/1988 | Sydansk | |
| 4,773,481 A | 9/1988 | Allison et al. | |
| 4,799,548 A | 1/1989 | Mumallah et al. | |
| 4,907,656 A | 3/1990 | Sanchez et al. | |
| 4,934,456 A | 6/1990 | Moradi-Araghi | |
| 4,950,698 A | 8/1990 | Shu et al. | |
| 5,246,073 A * | 9/1993 | Sandiford et al. ............ 166/295 |

(Continued)

FOREIGN PATENT DOCUMENTS

| | | |
|---|---|---|
| EP | 0577060 A2 | 1/1994 |
| WO | 9812415 | 3/1998 |

OTHER PUBLICATIONS

Downloaded from www.halliburton.com—Copyright 2008 Halliburton, USA: Stimulation—H2Zero Service—Cost-Effective Conformance Control.

(Continued)

*Primary Examiner* — Silvana Runyan
(74) *Attorney, Agent, or Firm* — Andrea E. Tran

(57) ABSTRACT

A composition for treating a subterranean formation is formed from water, a water-soluble polymer and a crosslinking system. The crosslinking system utilizes 1) primary crosslinking agent of at least one of a dialdehyde benzene source, a dioxane, and a trioxane, 2) a secondary low temperature organic crosslinking agent that generates aldehyde, and 3) a phenol source. The crosslinking system provides the composition a delayed gel time of about 2 to about 20 hours at temperatures of about 250° F. (121° C.) or higher. A method of treating a subterranean formation penetrated by a wellbore is also accomplished by forming a treatment fluid from the composition and introducing the treatment fluid into the formation through the wellbore.

24 Claims, 2 Drawing Sheets

(56) References Cited

U.S. PATENT DOCUMENTS

| | | | |
|---|---|---|---|
| 5,335,733 A | | 8/1994 | Sandiford et al. |
| 5,399,269 A | * | 3/1995 | Moradi-Araghi ............. 507/221 |
| 5,486,312 A | | 1/1996 | Sandiford et al. |
| 5,762,141 A | * | 6/1998 | Hutchins et al. ............. 166/295 |

OTHER PUBLICATIONS

IPTC11080—Evaluation of a New Cost-Effective Organic Gel System for High Temperature Water Control. Ghaithan A. Al-Muntasheri, Pacelli L. J. Zitha, and Hisham A . Nasr-El-Den. Copyright 2007, International Petroleum Technology Conference. Presented at the International Petroleum Technology Conference held in Dubai, U.A.E. Dec. 4-6, 2007.

SPE/DOE 27826—Application of Low-Toxicity Crosslinking Systems in Production of Thermally Stable Gels. Ahmad Moradi-Araghi. Copyright 1994, Society of Petroleum Engineers Inc. presented at the SPE/DOE Ninth Symposium on Improved Oil Recovery held in Tulsa, Oklahoma, USA Apr. 17-20, 1994.

SPE13501—Inexact Adaptive Newton Methods. W.I. Bertiger and F.J. Kelsey. Copyright 1985, Society of Petroleum Engineers. Presented at the SPE 1985 Reservoir Stimulation symposium held in Dallas, Texas Feb. 10-13, 1985.

SPE37246—Delaying Gelation of Aqueous Polymers at Elevated Temperatures Using Novel Organic Crosslinkers. H.T. Dovan, R.D. Hutchins, and B.B. Sandiford. Cpyright 1997, Society of Petroleum Engineers, Inc. Present at the 1997 SPE International Symposium on Oilfield Chemistry held in Houston, Texas Feb. 18-21, 1997.

SPE104071—Gelation Kinetics of an Organically Cross-Lined Gel at High Temperature and Pressure. G.A. Al-Muntasheri, H.A. Nasr-El-Din and P.L. J. Zitha. Copyright 2006, Society of Petroleum Engineers. Presented at the First International Oil Conference and Exhibition in Mexico held in Cancun, Mexico, Aug. 31-Sep. 2, 2006.

Gelation Kinetics and performance Evaluation of an Organically Crosslinked Gel at High Temperature and Pressure. G.A. Al-Montasher, H.A. Nasr-El-Din, and P.L.J. Zitha. Copyright 2008 Society of Petroleum Engineers. Sep. 2008 SPE Journal, pp. 337-345.

A Study of Polyacrylamide-Based Gels Crosslinked with Polyethyleneimine. Ghaithan A. Al-Muntasheri, Hisham A. Nasr-El-Din and Pacelli L.J. Zitha. Copyright 2009 Society of Petroleum Engineers. Jun. 2009 SPE Journal, pp. 245-251.

SPE121460—Stability of Partially Hydrolyzed Polyacrylamides at Elevated Temperatures in the Absence of Divalent Cations. R.S. Seright, A.R. Campbell and P.S. Mozley. Copyright 2009, Society of Petroelum Engineers. Presented at the 2009 SPE International Symposium n Oilfield Chemistry held in The Woodlands, Texas USA, Apr. 20-22, 2009.

Stability of Partially Hydrolyzed Polyacrylamides at Elevated Temperatures in teh Absence of Divalent Cations. R.S. Seright, A.R. Campbell, P.S. Mozley and Peihui Han. Jun. 2010 SPE Journal. Copyright 2010 Society of Petroleum Engineers. Presented at the SPE International Symposium on Oilfield Chemistry, the Woodlands, Texas USA, Apr. 20-22, 2009. pp. 341-348.

PCT/IB2011/052557—International Search Report with a mailing date of Oct. 7, 2011.

* cited by examiner

HIGH TEMPERATURE POLYMER GELS FOR WELL TREATMENTS AND THEIR USE

CROSS-REFERENCE TO RELATED APPLICATIONS

This application claims the benefit of U.S. Provisional Application Ser. No. 61/357,773, filed Jun. 23, 2010, which is incorporated herein by reference in its entirety.

FIELD

Embodiments of this invention relate to compositions and methods for treating high temperature subterranean formations.

BACKGROUND

The statements made in this section merely provide information related to the present disclosure and may not constitute prior art, and may describe some embodiments illustrating the invention.

High temperature polymer gels are needed for shutting off unwanted water in oil and gas reservoirs and/or shutting off gas in oil reservoirs. Water-soluble polymers are typically employed that are introduced into a formation and are subsequently crosslinked so that the polymers gel to facilitate shutting off the desired zone(s) of the formation. Metal crosslinking agents have been used in certain situations to crosslink polymers to form polymer gels. Metal crosslinking agents require complexing agents to delay crosslinking and many of those metal crosslinking systems gel within minutes at elevated temperatures.

Organic crosslinking agents may be preferred over metal crosslinking agents in certain instances due to environmental and other factors. One of the shortcomings of many organic crosslinking agents, however, is that they may also gel too rapidly in high temperature environments, which may be too short to facilitate injection and proper placement of the polymer fluid. Other organic crosslinking agents may be used in high temperature environments that facilitate delayed gelling of the polymer fluids. The gel times provided by such high temperature organic crosslinking agents, however, may be measured in days rather than hours, and therefore may be too slow to provide an effective treatment.

Accordingly, there is a need to provide a polymer fluid that provides a suitable gel time in high temperature environments that is neither too short nor too long.

SUMMARY

A composition for use in treating a subterranean formation is formed from water and a water-soluble polymer. The composition further includes a crosslinking system comprised of 1) a primary crosslinking agent of at least one of a dialdehyde benzene source, a dioxane, and a trioxane, 2) a secondary low temperature organic crosslinking agent that generates aldehyde, and 3) a phenol source. The crosslinking system provides the composition a delayed gel time of about 2 to about 20 hours at temperatures of about 250° F. (121° C.) or higher.

In specific embodiments, the dialdehyde benzene source may be a terephthalaldehyde source. The low temperature crosslinking agent may be selected from hexamethylenetetramine, paraldehyde, and combinations thereof. And the phenol source may be selected from phenyl acetate, hydroquinone, benzenediols, and combinations of these. The polymer may be at least one of an acrylamide-containing polymer and a polyvinyl-alcohol-containing polymer. The low temperature crosslinking agent may be used in an amount of from about 0.005% by weight to about 0.10% by weight of the composition. The primary crosslinking agent may be used in an amount of about 0.2% to about 3% by weight of the composition. And the phenol source may be used in an amount of from about 0.05% to about 3% by weight of the composition.

In certain applications, the crosslinking system may provide the composition a delayed gel time of about 2 to about 20 hours at temperatures of about 275° F. (135° C.) or higher. In other embodiments, the crosslinking system may provide a delayed gel time of the composition at temperatures of greater than about 275° F. (135° C.) of about 2 to about 6 hours.

In certain embodiments, the crosslinking system may further include an acid.

In another embodiment of the invention, a composition for use in treating a subterranean formation is formed from water and a water-soluble polymer of at least one of an acrylamide-containing polymer and a polyvinyl-alcohol-containing polymer. A crosslinking system of the composition is comprised of 1) a primary crosslinking agent of at least one of a terephthalaldehyde source, dioxane, and trioxane, the primary crosslinking agent being used in an amount of about 0.2% to about 3% by weight of the composition; 2) hexamethylenetetramine in amount of from about 0.005% to about 0.1% by weight to the composition; and 3) phenyl acetate in an amount of from about 0.05% to about 3% by weight of the composition. The crosslinking system may provide the composition a delayed gel time of about 2 to about 20 hours at temperatures of about 250° F. (121° C.) or higher. In certain embodiments, the composition may further include an acid.

A method of treating a subterranean formation penetrated by a wellbore is also provided. The method includes forming a treatment fluid composition formed from water and a water-soluble polymer. A crosslinking system is used in the treatment fluid comprised of 1) primary crosslinking agent of at least one of a dialdehyde benzene source, a dioxane, and a trioxane, 2) a secondary low temperature organic crosslinking agent that generates aldehyde, and 3) a phenol source. The crosslinking system provides the composition with a delayed gel time of the composition at temperatures of about 250° F. (121° C.) or higher of about 2 to about 20 hours. The treatment fluid is introduced into the formation through the wellbore to effect treatment.

In specific embodiments, the dialdehyde benzene source may be a terephthalaldehyde source. The low temperature crosslinking agent may be selected from hexamethylenetetramine, paraldehyde, and combinations thereof. And the phenol source may be selected from phenyl acetate, hydroquinone, benzenediols, and combinations of these. The polymer may be at least one of an acrylamide-containing polymer and a polyvinyl-alcohol-containing polymer. The low temperature crosslinking agent may be used in an amount of from about 0.005% by weight to about 0.10% by weight of the composition. The primary crosslinking agent may be used in an amount of from about 0.2% to about 3% by weight of the composition. And the phenol source may be used in an amount of from about 0.05% to about 3% by weight of the composition.

In certain applications of the method, the crosslinking system may provide the composition a delayed gel time of about 2 to about 20 hours at temperatures of about 275° F. (135° C.) or higher. In other embodiments, the crosslinking system may provide a delayed gel time of the composition at temperatures of greater than about 275° F. (135° C.) of about 2 to about 6 hours.

In one particular embodiment of the composition and method, the crosslinking system further comprises an acid and the primary crosslinking agent is trioxane.

BRIEF DESCRIPTION OF THE DRAWINGS

For a more complete understanding of some embodiments of the present invention, and the advantages thereof, reference is now made to the following descriptions taken in conjunction with the accompanying figures, in which.

DETAILED DESCRIPTION

Figure 1:
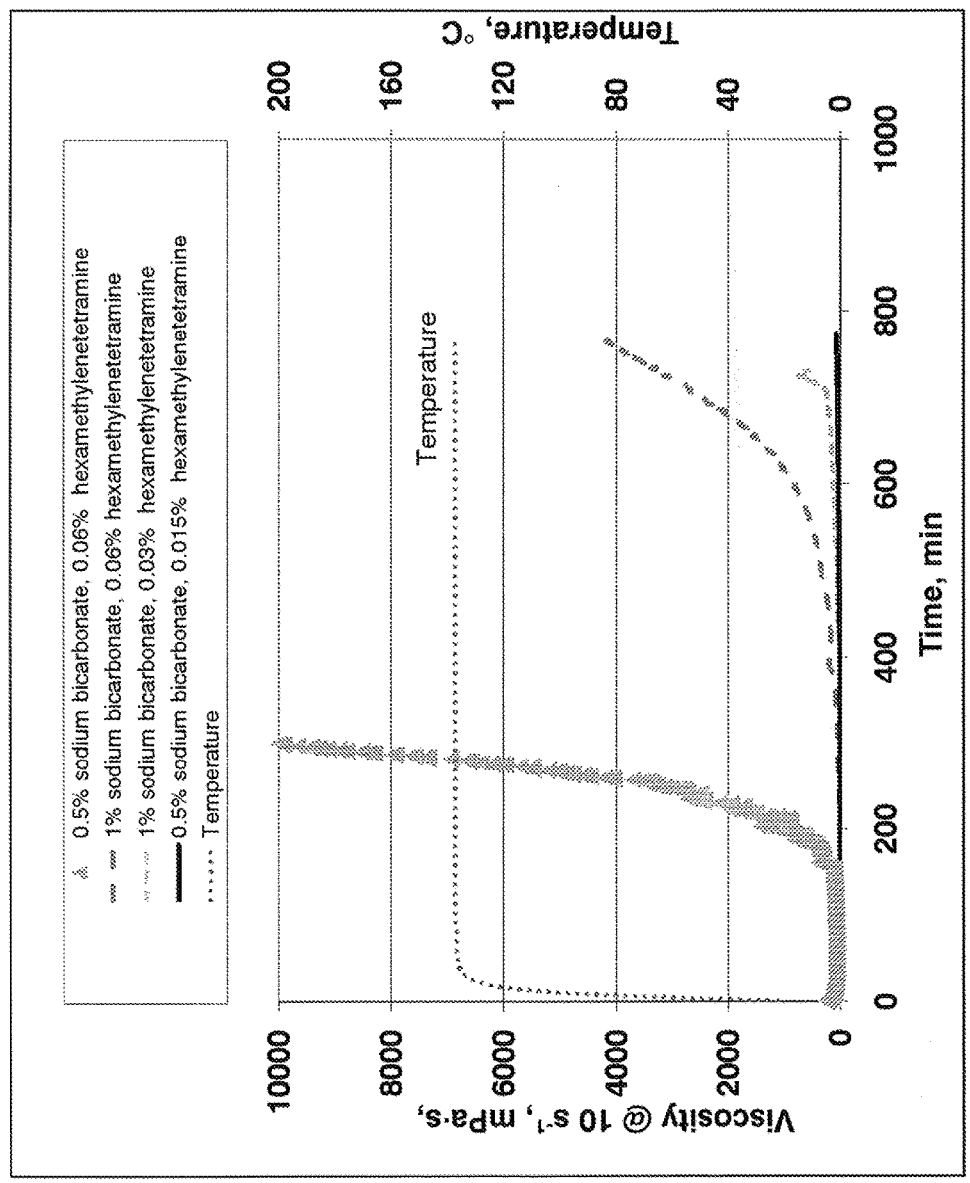
FIG. 1 is a plot of the gelation behavior over time of polymer solutions containing different crosslinking systems employing the primary crosslinking agent terephthalaldehyde (TPA) with various amounts of secondary crosslinking agent hexamethylenetetramine (HMTA) measured using a viscometer at 280° F. (137.8° C.)

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The present invention is directed toward a polymer fluid composition having a crosslinking system that makes use of a certain combination of organic crosslinking agents to create a desired polymer gel time in high temperature environments. The composition is particularly useful in treatment of high temperature subterranean formations of oil and gas wells, particularly those at 250° F. (121.1° C.) and above.

The polymers of the composition are typically acrylamide-containing polymers and are often referred to as "polyacrylamide" polymers. The polyacrylamide polymers may be anionic, cationic, or non-ionic polymers. These polymers may be copolymers of acrylamide and one or more other chemical species. The polyacrylamide may also be used as a homopolymer or as a hydrolyzed version of a homopolymer containing acrylate groups. Also, although the polymer or polymers used at the surface may be substantially devoid of acrylate groups, it is expected that some of the acrylamide groups will hydrolyze and form acrylate groups at the elevated temperature before, during or after the gelation reaction has occurred. As used herein, the expression "polyacrylamide" and similar expressions is meant to encompass both acrylamide homopolymers and copolymers, unless expressly stated otherwise or as is apparent from its context, and including those that may be formed in situ. As used herein, "homopolymers" are those polymers containing less than about 0.1% by weight of other comonomers. Combinations or mixtures of homopolymers and copolymers may be used as well. The copolymers may include two or more different comonomers and may be random or block copolymers. Non-limiting examples of polyacrylamide polymers are those described in U.S. Pat. Nos. 4,744,418, 5,486,312 and 5,762,141, each of which is incorporated herein by reference for all purposes. Particularly preferred monomers include acrylamide, acrylamido-2-methyl propane sulfonate, N-vinyl pyrrolidone and vinyl acetates that have hydrolyzed sufficiently to vinyl alcohol to impart water solubility. In certain instances, other non-polyacrylamide polymers capable of being gelled or crosslinked with the crosslinking systems described herein may also be employed. Such polymers may include polyvinyl alcohol polymers and those polymers containing OH, $NH_2$, $CONH_2$, COR and SH functional groups. A mixture of different water soluble polymers may also be used. The polymers can be supplied in various forms including solid, solution, emulsions, dispersions or gel logs. Different types of equipment for hydrating the various polymer forms in water or brine may be utilized.

The polyacrylamide polymers useful for embodiments of the invention may include those having an average molecular weight of about 10,000 to about 25 million, with those from about 100,000 to about 20 million being more typical, and those with average molecular weight of from about 200,000 to about 10 million being particularly useful. Those polymers with lower average molecular weight (i.e. MW less than 1 million) may be used at higher concentrations, such as from about 2% to about 10% by weight of the composition. Such low molecular weight polymers (e.g. MW 200,000 to 1 million) typically provide more rigid gels, such as those that may be used in for matrix pore plugging. Rigid gels are often used to fix casing leaks, plug microannuli in the cement sheath surrounding the casing, seal zones that are watered out, seal zones producing unwanted gas and to prevent sand production. Higher molecular weight polymer gels (i.e. MW greater than 1 million) may be used in smaller amounts, such as from about 0.3% to about 2% by weight of the composition. The higher molecular weight polymer gels may provide flowing or flexible gels, such as those that may be used in plugging fractures and fissures. Common applications in the oilfield include shutting off water producing fissures, fractures and faults, especially in carbonate formations, and sealing fractures moving downward to an aquifer. The actual amount of polymer used in the composition, however, may be bounded by the minimum amount necessary to form the desired polymer gel under the particular conditions and applications for which it is used up to its solubility limit or the particular rheological constraints of the polymer solution.

The crosslinking system of the composition is an organic crosslinking system that is based on the formation of phenol-aldehyde bonds. In its most basic form, the phenol-aldehyde bonds are formed by the condensation reaction of phenol with formaldehyde. The formed phenol-aldehyde bond facilitates linking of the polymer chains together to provide the gelled or cross-linked polymer. The use of phenol and formaldehyde itself in polymer solutions is typically avoided due to environmental and handling concerns associated with such materials and due to the rapid reaction that would occur, resulting in early gelation. Accordingly, compounds that serve as precursors to phenol and formaldehyde may be used to delay the gelation times. By providing a crosslinking system that utilizes particular compounds, desired delayed gelation times of the polymer fluids can be achieved in high temperature environments. In particular, the crosslinking system makes use of a primary organic crosslinking agent of a dialdehyde benzene, dioxane and/or trioxane. The primary crosslinking agent may also include sources of these compounds, such as their precursors that eventually form the dialdehyde benzene in situ. Trioxane is a precursor for formaldehyde and releases three molecules of formaldehyde upon breaking down with heat and/or acid and either 1,3-dioxane or 1,4-dioxane yields two molecules. Substituted trioxane or dioxane can also be used, such as 2,2,4,4,6,6-hexaphenyl-1,3,5-trioxane.

The dialdehyde benzene may be a dialdehyde benzene or a precursor of a dialdehyde benzene. Particularly useful as the dialdehyde benzene is terephthalaldehyde (TPA). Terephthalaldehyde is a para-isomer of phthalaldehyde and breaks down to form two aldehyde molecules. The dialdehyde benzene may also include the isomers of a o-phthalaldehyde or m-phthalaldehyde. The dialdehyde benzene source may also include the precursors of dialdehyde benzene, such as terephthalic acid, 4-formyl benzoid acid, etc.

The primary crosslinking agent may be used in an amount of about 0.2% to about 3% by weight of the composition, more particularly from about 0.5% to about 2% by weight of the composition.

These primary crosslinking compounds are useful in high temperature applications because they are less reactive or do not readily degrade even at high temperatures to generate the active aldehyde species that forms the phenol-aldehyde bond necessary for crosslinking. On their own, however, the delay in gelling time from these compounds is much too slow for many applications, with gel times being measured in terms of days, even at high temperature.

By using limited amounts of secondary low temperature organic crosslinking agents, acceptable delayed gel times in high temperature environments can be obtained when used with the primary crosslinking agents. The formed gels also exhibit long term stability in high temperature environments for time periods of months to years. The secondary low temperature organic crosslinking agent is one that also is an aldehyde or an aldehyde precursor that is more reactive and breaks down at lower temperatures to form the active aldehyde species. One such suitable low temperature organic crosslinking agent is hexamethylenetetramine (HMTA). HMTA breaks down in the presence of heat and/or acid to form six molecules of formaldehyde and four molecules of ammonia. Other useful low temperature organic crosslinkers include paraformaldehyde that yields formaldehyde and paraldehyde, which breaks down to form acetaldehyde.

On its own as an aldehyde crosslinking agent, HMTA may provide gel times of less than 30 minutes at high temperatures (e.g. 300° F./148.9° C.). The amount of the secondary low temperature organic crosslinker is therefore limited. The HMTA or secondary low temperature organic crosslinker may be used in amount of about 0.005% by weight to about 0.10% by weight of the composition. In more specific embodiments, the amount of secondary low temperature organic crosslinker may be used in an amount of from about 0.02% to about 0.06% by weight of the composition, more particularly from about 0.03% to about 0.05% by weight of the composition.

A phenol source is also used in combination with the primary and secondary crosslinking agents. The phenol source may be phenol, substituted phenols, and precursors of these. In certain applications, the phenol precursors provide the phenol in situ. A particularly well suited phenol precursor for some embodiments is phenyl acetate, which is an ester of phenylacetic acid. The phenyl acetate hydrolyzes with heat to form phenol in situ. Other suitable phenol sources may include related compounds such as salicylamide, salicyl alcohol, salicylic acid, acetylsalicylic acid, 4-aminosalicylic acid, o- and p-aminobenzoic acid, m-aminophenol, phenyl salicylate, and methyl p-hydroxybenzoate, and precursors of these. The phenol source may also include hydroquinone, resorcinol, catechol, phloroglucinol, gallic acid, pyrogallol, 4,4'diphenol, 1,3-dihydroxynaphthalene, 1,4-benzoquinone, quinhydrone, tannin, phenyl benzoate, 1-napthyle acetate, 2-napthyle acetate, phenyl chloroacetate, hydroxyphenylalkanols, and precursors of these compounds. Various combinations of the different phenol sources may also be used. Phenyl acetate is particularly well suited for some embodiments because of its ability to generate acid when it reacts to yield the phenol.

The phenol source may be used in an amount of about 0.05% by weight to about 3% by weight of the composition. In particular embodiments, the phenol source may be used in an amount of about 0.1% to about 1.5% by weight of the composition, more particularly about 0.3% to about 1.2% by weight of the composition. The amount of phenolic additive may be chosen to maintain a minimum ratio of phenol to aldehyde of about 0.5 or more.

In certain embodiments, the crosslinking system may include an optional acid. The acid facilitates breaking down of the precursors where heat alone may be insufficient to break down the primary crosslinking agent or the delay is too long to provide the desired gel times. In particular, an optional acid may be used with trioxane in certain applications due to its slower breakdown to active crosslinking species, particularly at temperatures below 300° F. (148.9° C.). An acid may be used in combination with any and all of the primary crosslinking agents described herein, however, or it may not be used at all. The acid may be any acid that facilitates breaking down of the primary crosslinking agent (when it is a precursor to an aldehyde) and that is compatible with the other components of the composition and the applications for which it is used. The form of the acid is not particularly important, although some acids provide hydrogen ions more readily so the pH is changed dramatically while weaker acids may provide hydrogen ions at a higher pH, but tend to maintain that pH level. The acid may be polylactic acid (PLA) fibers or particles or other type of components which generally either hydrolyze or thermally decompose to form an acid downhole. As well, the acid may be encapsulated acid or latent acid or carbon dioxide.

Non-limiting examples of suitable acids include HCl, para-toluenesulfonic acid, and acetic acid. The acid may be used in certain applications in an amount of zero to less than about 2% by weight of the composition, more particularly about 0.05% to about 0.5% by weight of the composition.

The composition may include other components in addition to those previously described. These may include those that are known to be commonly used in oilfield applications by those skilled in the art. These include, but are not necessarily limited to, materials such as surfactants, breakers, high temperature fluid stabilizers, oxygen scavengers, alcohols, solvents, scale inhibitors, corrosion inhibitors, fluid-loss additives, bactericides, clay stabilizers, water softeners, and the like. Such components would be selected to be compatible with the crosslinking system.

The water used for the polymer compositions may be an aqueous fluid, such as fresh water, sea water, brine (e.g. KCl, NaCl, Ca, etc.), etc.

Because the composition may be formulated using precursors of the reactive crosslinking components, the crosslinking is thermally driven so that the delayed gelling may be provided at high temperature. Specifically, the crosslinking system provides the compositions with a delayed gel time of about 2 hours to about 20 hours. More particularly, the crosslinking system provides a delayed gel time of about 2.5 hours to about 10 hours and still more particularly about 3 hours to about 6 hours, at temperatures of about 250° F. (121° C.), 275° F. (135° C.), 300° F. (148.9° C.), 325° F. (162.8° C.), 350° F. (176.7° C.) or higher. The compositions have particular application for use at temperatures from about 250° F. (121° C.) or 275° F. (135° C.) to about 325° F. (162.8° C.) or 350° F. (176.7° C.).

Because the composition provides a delayed gelling effect, it may also be used without any crosslinking rate retarding agents, such as those disclosed in U.S. Pat. No. 5,762,141, which is incorporated by reference herein.

The precursors forming the composition are also more safely handled at the surface than the generated active species that are formed under high temperatures within the formation. This also allows the formulation to be prepared ahead of time so that it can be transported and stored without the thermal or acidic conversion of the precursors to the active species.

As used herein, the polymer solutions and their gel properties may be characterized in terms of the criteria set forth in U.S. Pat. No. 4,744,418, which is herein incorporated by reference for all purposes. As described therein, gel strengths may be categorized by the codes A-J with the following characteristics set forth in Table 1 below:

TABLE 1

| Gel Strength Code | Description |
| --- | --- |
| A | No detectable gel formed: the gel appears to have the same viscosity as the original polymer solution and no gel is visually detectable. |
| B | Highly flowing gel: the gel appears to be only slightly more viscous than the original polymer solution. |
| C | Flowing gel: most of the obviously detectable gel flows to the bottle cap upon inversion. |
| D | Moderately flowing gel: only a small (about 5 to 15%) of the gel does not readily flow to the bottle cap upon inversion. Usually characterized as a tonguing gel i.e. after hanging out of jar gel can be made to flow back into the bottle by slowly turning the bottle upright. |
| E | Barely flowing gel: the gel can barely flow to the bottle cap and or a significant portion (>15%) of the gel does not flow upon inversion. |
| F | Highly deformable non-flowing gel: the gel does not flow to the bottle cap upon inversion. |
| G | Moderately deformable non-flowing gel: the gel flows about half way down the bottle upon inversion. |
| H | Slightly deformable non-flowing gel: the gel surface only slightly deforms upon inversion. |
| I | A rigid gel: there is no gel-surface deformation upon inversion of the bottle. |
| J | A ringing rigid gel: a "tuning fork like" mechanical vibration can be produced by tapping the bottle. |

As used herein, a fluid is considered gelled when it meets the criteria of any of the gel strength codes D-J, as set forth in Table 1. Rigid gels typically have a gel code of H-J, while flowing gels may be characterized with a code of D-G. Gel time and gel strength can also be measured using various rheological parameters such as viscosity and elastic modulus, $G'$.

In use, the materials of the composition may be mixed in a batch operation or on the fly at the surface. The treatment fluid is then introduced into the wellbore of the formation to facilitate treatment. The composition has particular application for use in water shut off in oil and gas wells and in gas shut off in oil wells. It is common to apply the rigid gels to zones or portions of the well that have been mechanically isolated from the other productive zones, such as through the use of packers, bridge plugs, sliding sleeves, sand plugs, etc. The mechanical tools can be used with drill pipe, a work string or coiled tubing. The zone for treatment is often selected by using wireline logging techniques, such as production logging, temperature logging, reservoir saturation logging or carbon-oxygen logging. Once isolation of the offending zone is in place, brine or other fluid is injected to verify injectivity followed by the treatment fluid and a flush fluid to displace the treatment fluid down to the zone being treated. Some of the treatment fluid might be left in the wellbore or it can be flushed just into the formation. In certain cases, the treatment fluid is followed by a cement cap applied by squeezing the formation. After injection, the well is shut-in for a few hours to a few days to allow the gel reactions to occur. Following removal of any temporary mechanical isolation tools, the well can be logged to see if the zone has successfully been shutoff. Alternatively, the production is monitored for changes in the ratio and amounts of water oil and/or gas produced.

The following examples serve to further illustrate the invention.

EXAMPLES

Experimental

Different polymers were used in each of the examples. Polymer A was a cationic polyacrylamide polymer that had approximately 30% cationic character and an average molecular weight of from about 8 to 10 million daltons. Polymer B was a partially hydrolyzed polyacrylamide polymer with about 5% hydrolysis and an average molecular weight of about 500,000. Polymer C was a partially hydrolyzed polyacrylamide polymer with about 10% hydrolysis and an average molecular weight of about 5 million daltons.

In Examples 1-3, because the temperatures for the testing would exceed the boiling point of water and because the intrusion of oxygen at elevated temperatures can result in rapid gel degradation, sealed ampoules were used. The ampoules used were glass pressure vessels containing 6 mL of fluid and 4 mL of a vapor phase that was purged with argon gas to reduce oxygen content. The sealing mechanism involves a Teflon® threaded cap fitted with a Viton® O-ring that screws into the glass ampoule. As the aqueous fluid heats up, vapor pressure is created that prevents boiling of the fluid. This apparatus is available from Ace Glass of Vineland, N.J. The ampoules were loaded into an enclosure, placed in an oven at temperature and periodically examined for gel properties using the gel strength codes of Table 1, as previously discussed. In certain instances the gel code may be followed by a percentage that indicates the presence of a separated phase (syneresis).

Comparative Example 1

Aqueous polymer solutions using trioxane as part of the crosslinking system, both with and without acetic acid, were tested. Different polymer solutions using the Polymers A-C were prepared. The polymer solutions were prepared in deionized water. All solutions contained 1% phenyl acetate by weight. The polymers were heated to 300° F. (148.9° C.) and periodically examined. The results are presented in Table 2 below.

TABLE 2

| Sample | Trioxane (wt. %) | Polymer (wt. %) | Acetic Acid (wt. %) | \multicolumn{7}{c}{Aging Time, hours} |||||||
|---|---|---|---|---|---|---|---|---|---|---|
|  |  |  |  | 1 | 4 | 6 | 23 | 4 days | 5 Days | 6 Days |
| 1 | 1% | 1% A | 0 | A | A | A | H/50% | I/50% | I/50% | — |
| 2 | 0.5% | 1% A | 0 | A | A | A | I | I/50% | I/50% | — |
| 3 | 1% | 1% A | 0.2 | A | A | A | H/50% | I/50% | I/50% | — |
| 4 | 0.5% | 1% A | 0.2 | A | A | A | I | I/50% | I/50% | — |
| 5 | 1% | 5% B | 0 | A | A | A | E | I | I | I |
| 6 | 0.5% | 5% B | 0 | A | A | A | E | D | I | I |
| 7 | 1% | 5% B | 0.2 | A | A | A | I | I | I | I |
| 8 | 0.5% | 5% B | 0.2 | A | A | A | C | D | H | I |
| 9 | 1% | 1% C | 0 | A | A | A | B | I | I | I |
| 10 | 0.5% | 1% C | 0 | A | A | A | A | A | A | F |
| 11 | 1% | 1% C | 0.2 | A | A | A | I | I | I/50% | — |
| 12 | 0.5% | 1% C | 0.2 | A | A | A | A | I | I | I |

Comparative Example 2

Aqueous polymer solutions using terephthalaldehyde (TPA) and phenyl acetate as the crosslinking system, both with and without acetic acid, were tested. The TPA was used in an amount of 1% by weight of the composition. The polymers used were the Polymers A-C. The polymer solutions were prepared in deionized water. Phenyl acetate was used in varying amounts. The samples were heated to 300° F. (148.9° C.) and periodically examined. The results are presented in Table 3 below.

TABLE 3

| Sample | Phenyl Acetate (wt. %) | Polymer (wt. %) | Acetic Acid (wt. %) | \multicolumn{5}{c}{Aging Time, hours} |||||
|---|---|---|---|---|---|---|---|---|
|  |  |  |  | 1 | 3.5 | 21 | 4 days | 5 days |
| 1 | 0.5 | 5% B | 0.2 | A | A | H | I | I |
| 2 | 1 | 5% B | 0.2 | A | A | I | I | I |
| 3 | 0.5 | 1% A | 0 | A | A | B | B | G |
| 4 | 1 | 1% A | 0 | A | A | A | I | I |
| 5 | 0.5 | 1% A | 0.2 | A | A | A | B | H |
| 6 | 1 | 1% A | 0.2 | A | A | A | I | I |
| 7 | 0.5 | 1% C | 0 | A | A | B | B | D |
| 8 | 1 | 1% C | 0 | A | A | B-C | I | I |
| 9 | 0.5 | 1% C | 0.2 | A | A | A | G | H |
| 10 | 1 | 1% C | 0.2 | A | A | A | I | I |

Example 3

Aqueous polymer solutions using a combination of terepthalaldehyde (TPA) and phenyl acetate, both with and without hexamethylenetetramine (HMTA), as the crosslinking system were tested. The TPA was used in an amount of 1% by weight of the composition. Polymer B was used as the polymer in an amount of approximately 5% by weight of the composition. The polymer solutions were prepared in deionized water. Phenyl acetate was used in varying amounts. Potassium chloride (KCl), which is known to accelerate gelation, was used in Samples 2 and 3 without HMTA. The samples were heated to 300° F. (148.9° C.) and periodically examined. The results are presented in Table 4 below. From Table 4 the acceleration of gelation can be seen with the addition of small amounts of HMTA.

TABLE 4

| Sample | Phenyl Acetate (wt. %) | HMTA (wt. %) | KCl (wt. %) | \multicolumn{5}{c}{Aging Time} |||||
|---|---|---|---|---|---|---|---|---|
|  |  |  |  | 2 hours | 4 hours | 6 hours | 2 days | 8 days |
| 1 | 0.5 | 0.05% |  | A | H | I | I | I |
| 2 | 0.5 |  | 2% | A | B | B | I | I |
| 3 | 1 |  | 2% | A | B | B | I | I |
| 4 | 1 | 0.05% |  | A | G | H | I | I |
| 5 | 1 | 0.1% |  | A | I | I | I | I |

Example 4

Tests of polymer solutions using a viscometer were made using various crosslinking systems. Polymer B was dispersed in water at 5% by weight of the composition. The primary crosslinking agent was TPA at 1.5% by weight of the composition. Phenyl acetate was used in an amount of 1.5% by weight of the composition. Different samples of the polymer solutions were prepared with the amount of HMTA and sodium bicarbonate being varied. The polymer solutions were tested at 280° F. (137.8° C.) using a Grace 5600 viscometer available from Grace Instruments, Houston, Tex. at a shear rate of 10 reciprocal seconds using the standard model 50 configuration of bob 5 and rotor 1. The results are presented in FIG. 1. Gelation is indicated by the viscosity curve turning upwards from the baseline. Gelation begins faster when higher levels of HMTA are used (0.06 and 0.03% HMTA), while the lowest level of 0.015% did not gel in the time of this experiment (about 800 minutes). Increasing amounts of sodium bicarbonate from 0.5% to 1% also offered some delay when the HMTA level was 0.06%. Sodium bicarbonate is often added to stabilize the gel when the water of mixing contains divalent ions.

Example 5

Figure 2:
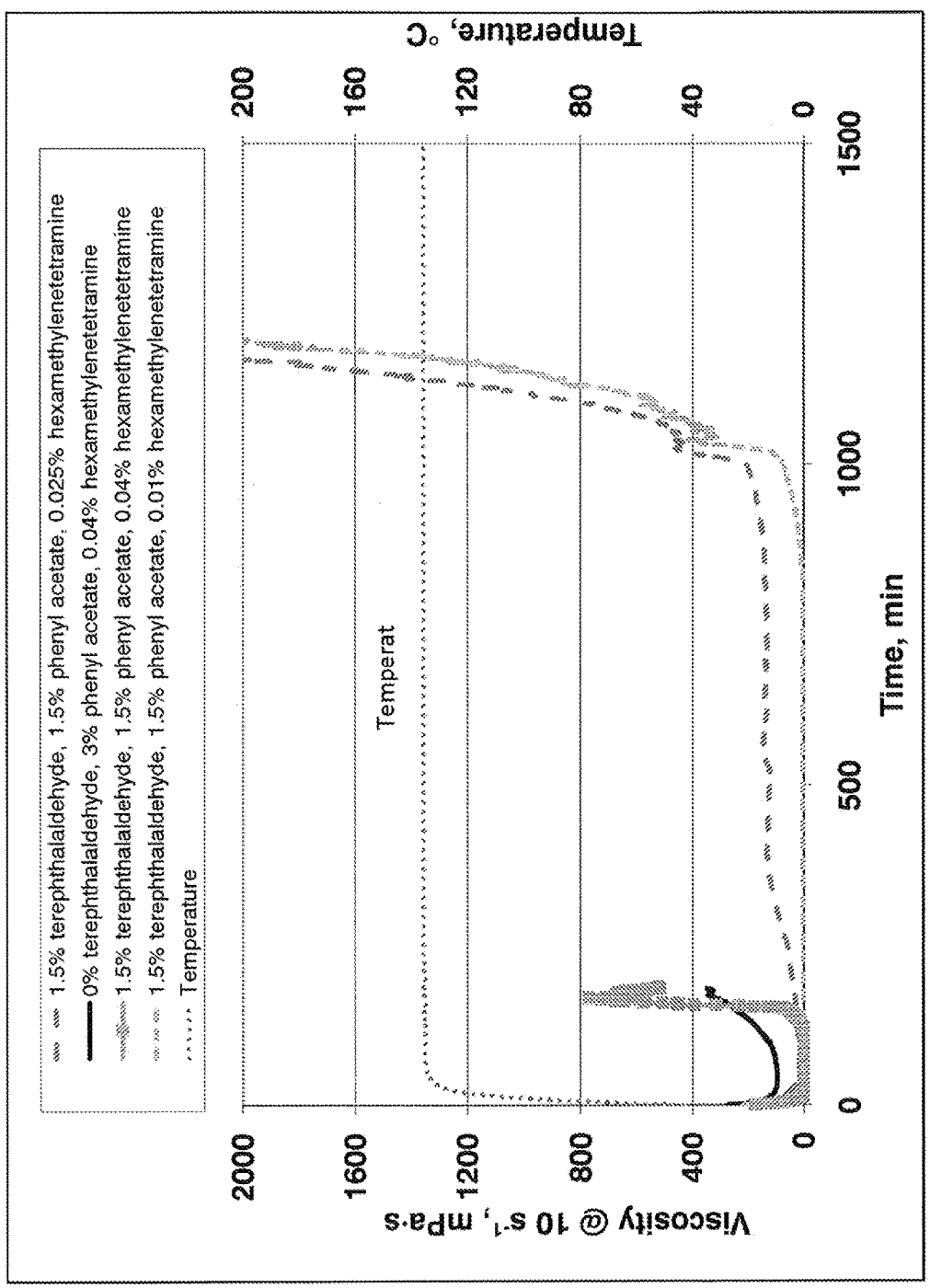
FIG. 2 is a plot of the gelation behavior over time of polymer solutions containing different crosslinking systems employing different amounts of terephthalaldehyde (TPA) and hexamethylenetetramine (HMTA) measured using a viscometer at 280° F. (137.8° C.).

Tests of polymer solutions using a viscometer were made using various crosslinking systems. Polymer B was dispersed in water at 5% by weight of the composition. The primary crosslinking agent TPA and the secondary crosslinking agent HMTA were used at different concentrations. Phenyl acetate was used in an amount of 1.5% by weight of the composition, but was increased to 3% in the sample that contained no TPA. The polymer solutions were tested at 280° F. (137.8° C.) using a Grace 5600 viscometer available from Grace Instruments, Houston, Tex. at a shear rate of 10 reciprocal seconds using the standard model 50 configuration of bob 5 and rotor 1. The results are presented in FIG. 2. The results demonstrate that increasing levels of HMTA increased the gelation rate. Further, the sample containing 0% TPA and 3% phenyl acetate gels the fastest because of the acid released from the phenyl acetate. Gelation in this case can be controlled from more than 1000 minutes to less than 200 minutes by selection of appropriate amounts of HMTA and phenyl acetate.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A composition for use in treating a subterranean formation, the composition comprising:
   water;
   a water-soluble polymer; and
   a crosslinking system comprised of 1) primary crosslinking agent of at least one of a dialdehyde benzene source, a dioxane, and a trioxane, 2) a secondary low temperature organic crosslinking agent that generates aldehyde, and 3) a phenol source;
   wherein the crosslinking system provides the composition a delayed gel time of about 2 to about 20 hours at temperatures of about 250° F. (121° C.) or higher, and
   wherein the phenol source is selected from the group consisting of phenyl acetate, hydroquinone, benzenediols, and combinations thereof.

2. The composition of claim 1, wherein the dialdehyde benzene source is a terephthalaldehyde source.

3. The composition of claim 1, wherein the low temperature crosslinking agent is selected from hexamethylenetetramine, paraldehyde, and combinations thereof.

4. The composition of claim 1, wherein the low temperature crosslinking agent is used in an amount of from about 0.005% by weight to about 0.10% by weight of the composition.

5. The composition of claim 1, wherein the primary crosslinking agent is used in an amount of about 0.2% to about 3% by weight of the composition.

6. The composition of claim 1, wherein the phenol source is used in an amount of about 0.05% to about 3% by weight of the composition.

7. The composition of claim 1, wherein the crosslinking system provides the composition a delayed gel time of about 2 to about 20 hours at temperatures of about 275° F. (135° C.) or higher.

8. The composition of claim 1, wherein the crosslinking system provides a delayed gel time of the composition at temperatures of greater than about 275° F. (135° C.) of about 2 to about 6 hours.

9. The composition of claim 1, wherein the polymer is at least one of an acrylamide-containing polymer and a polyvinyl-alcohol-containing polymer.

10. The composition of claim 1, wherein the crosslinking system further comprises an acid.

11. The composition of claim 10, wherein the primary crosslinking agent is trioxane.

12. A composition for use in treating a subterranean formation, the composition comprising:
    water;
    a water-soluble polymer of at least one of an acrylamide-containing polymer and a polyvinyl-alcohol-containing polymer;
    a crosslinking system comprised of 1) a primary crosslinking agent of at least one of a terephthalaldehyde source, dioxane, and trioxane, the primary crosslinking agent being used in an amount of about 0.2% to about 3% by weight of the composition; 2) hexamethylenetetramine in amount of about 0.005% to about 0.1% by weight to the composition; and 3) phenyl acetate in an amount of about 0.05% to about 3% by weight of the composition; and wherein
    the crosslinking system provides the composition a delayed gel time of about 2 to about 20 hours at temperatures of about 250° F. (121° C.) or higher.

13. The composition of claim 12, wherein the composition further includes an acid.

14. A method of treating a subterranean formation penetrated by a wellbore, the method comprising:
    forming a treatment fluid composition comprising:
       water;
       a water-soluble polymer;
       a crosslinking system comprised of 1) primary crosslinking agent of at least one of a dialdehyde benzene source, a dioxane, and a trioxane, 2) a secondary low temperature organic crosslinking agent that generates aldehyde, and 3) a phenol source selected from the group consisting of phenyl acetate, hydroquinone, benzenediols, and combinations thereof; and wherein
       the crosslinking system provides a delayed gel time of the composition at temperatures of about 250° F. (121° C.) or higher of about 2 to about 20 hours; and
    introducing the treatment fluid into the formation through the wellbore.

15. The method of claim 14, wherein the dialdehyde benzene source is a terephthalaldehyde source.

16. The method of claim 14, wherein the low temperature crosslinking agent is selected from hexamethylenetetramine, paraldehyde, and combinations thereof.

17. The method of claim 14, wherein the low temperature crosslinking agent is used in an amount of about 0.005% by weight to about 0.10% by weight of the composition.

18. The method of claim 14, wherein the primary crosslinking agent is used in an amount of from about 0.2% to about 3% by weight of the composition.

19. The method of claim 14, wherein the phenol source is used in an amount of from about 0.05% to about 3% by weight of the composition.

20. The method of claim 14, wherein the crosslinking system provides the composition a delayed gel time of about 2 to about 20 hours at temperatures of about 275° F. (135° C.) or higher.

21. The method of claim 14, wherein the crosslinking system provides a delayed gel time of the composition at temperatures of greater than about 275° F. (135° C.) of from about 2 to about 6 hours.

22. The method of claim 14, wherein the polymer is at least one of an acrylamide-containing polymer and a polyvinyl-alcohol-containing polymer.

23. The method of claim 14, wherein the crosslinking system further comprises an acid.

24. The method of claim 22, wherein the primary crosslinking agent is trioxane.

* * * * *